United States Patent [19]
Bartetzko

[11] Patent Number: 5,565,237
[45] Date of Patent: Oct. 15, 1996

[54] PERMANENT CHARACTERIZATION OF GLASS PANES

[75] Inventor: Joachim Bartetzko, Stolberg, Germany

[73] Assignee: Saint Gobain Vitrage International, Courbevoie, Germany

[21] Appl. No.: 470,654

[22] Filed: Jun. 6, 1995

Related U.S. Application Data

[63] Continuation of Ser. No. 163,401, Dec. 7, 1993, abandoned, which is a continuation of Ser. No. 623,467, Dec. 7, 1990, abandoned.

[30] Foreign Application Priority Data

Dec. 9, 1989 [DE] Germany ........................ 39 40 749.7

[51] Int. Cl.⁶ ................... C03C 17/34; C03C 17/38; B05D 3/02; B05D 5/00
[52] U.S. Cl. .................... 427/145; 427/226; 427/246; 427/266; 65/60.2; 65/60.3
[58] Field of Search ...................... 427/264, 266, 427/228, 226, 541, 542, 544, 545, 552, 555, 557, 558, 559, 229, 145; 65/60.2, 60.3

[56] References Cited

U.S. PATENT DOCUMENTS

| | | | |
|---|---|---|---|
| 1,641,820 | 9/1927 | Lewis | 427/266 |
| 1,646,468 | 10/1927 | Warga. | |
| 3,441,424 | 4/1969 | Bolgiano | 65/60.2 X |
| 3,647,506 | 3/1972 | Greil | 427/559 |
| 4,025,669 | 5/1977 | Greenstein | 427/265 X |
| 4,064,303 | 12/1977 | Vassiliou | 427/145 |
| 4,477,486 | 10/1984 | Boaz | 427/264 |
| 4,503,437 | 3/1985 | Katzschner | 346/1.1 |
| 4,514,456 | 4/1985 | Deal et al. | 427/555 |
| 4,594,266 | 6/1986 | Lemaire et al. | 427/542 |
| 4,791,267 | 12/1988 | Yokoyama et al. | 427/541 |
| 4,847,138 | 7/1989 | Boylan et al. | 427/555 |
| 5,120,570 | 6/1992 | Boaz | 427/541 |

FOREIGN PATENT DOCUMENTS 3638170 11/1988 Germany.
1521041 8/1978 United Kingdom.

OTHER PUBLICATIONS

Kirk et al, ed. *Encyclopedia of Chemical Technology*, chapter on "Glass" p. 435–453, 2nd Supplemental vol. ed. A. Standen, The Interscience Encyclopedia, INC., N.Y. 1960 (no month).
Andrews, A. I., "The Preparation, Application and Properties of Enamels", *Porcelain Enamels*, Second Ed., 10–13, 408–13. No date.
Kirk–Othmer, "Inks", *Encyclopedia of Chem. Tech.* 13:(3) 374–98 (1981). No month.
Kirk–Othmer, "Enamels, Porcelain or Vitreous", *Encyclopedia of Chem. Tech.* 9:(3) 1–20 (1980) No month.
Kirk–Othmer, "Coatings, Industrial", *Encyclopedia of Chem. Tech.* 6:(3) 427–45 (1979). No month.
"Vitreous Enamels", *Borax Consolidated Ltd.*, London, pp. v,x,i (1960). No month.
Hackh's Chemical Dictionary, 3rd edition no month 1944, J. Grant–editor p. 39, 148 and 156 McGraw–Hill Book Com., (no month) Inc., N.Y.
Handbook of Chemistry and Physics, 56th ed., no month 1976, R. C. Weast, ed. p. B–67 CRC. Press, Cleveland Ohio (no month).

*Primary Examiner*—Marianne Padgett
*Attorney, Agent, or Firm*—Pennie & Edmonds

[57] ABSTRACT

A means of permanently characterizing a glass workpiece (1) which is subjected to a heat treatment period during processing. An organic paint is utilized to apply identifying characteristics (3), and an inorganic bake-on paint is used to create an opaque permanent layer (5) in the region of the identifying characteristics (3). Heat treatment is utilized to create surface marks (4) on the workpiece (1) from the vaporization and burning of the organic paint into the inorganic paint.

13 Claims, 1 Drawing Sheet

PERMANENT CHARACTERIZATION OF GLASS PANES

This is a continuation of application Ser. No. 08/163,401, filed Dec. 7, 1993, now abandoned which is a continuation of Ser. No. 07/623,467, filed Dec. 7, 1990, now abandoned.

BACKGROUND OF THE INVENTION

This invention relates to a method of permanently characterizing or lettering workpieces which are subjected to a heat treatment in the course of their processing. More specifically, this invention relates to an automobile glass pane characterized by the method of the invention.

The characterization of workpieces before they are processed in various process stations may be advisable for various reasons. For example, it may be desirable to provide workpieces with individual characterization and/or information data for the purpose of following the progress of the product during its production operation. Such a following of the progress of the product is desirable for quality assurance so that if any production faults occur, the cause of the faults can be rapidly and clearly recognized.

Typically, in the prior art, organic paints or inks provide means for .characterization. Identifying numbers, letters and/or other indicia are simply painted onto a workpiece by processes known to those skilled in the art. The problem with characterizing workpieces in this manner occurs if the workpieces are subjected, during the course of their processing, to a heat treatment at a high temperature of about 500° to 600° C. For example, automobile glass panes are heat processed to provide bent and/or toughened glass panes. Also, workpieces of metal are heated to a high temperature during machining. In these cases, the usual methods of characterization or identification by means of organic paints or inks fail because these paints or inks burn at heat treatment temperatures, and the characterization is no longer visible.

A permanent characterization or identification is possible, even at these high temperatures, by printing with an inorganic bake-on paint which melts and bakes in at heat treatment temperatures. However, the bake-on paints commonly used for this purpose can only be applied with the, help of specific printing methods, specifically by means of a screen printing method known in the art. Unfortunately, the screen printing method is unsuitable for the purposes of individually labelling workpieces (e.g., in the example used above where unique characterization is utilized to follow the progress of a product during production). Here, a continually changing characterization or identification must be carried out so as to identify each individual workpiece. In this case, a different printing screen would be required for every workpiece, which is unacceptable because of the high cost of screen printing.

SUMMARY OF THE INVENTION

The objective of the present invention, therefore, is to create a method for characterization or lettering workpieces which are subjected, during the course of their processing or manufacturing, to a high temperature heat treatment, and which require a permanent unique characterization which is preferably simple and inexpensive. In particular, the method shall be suitable for the individual characterization of automobile glass panes which are subjected to a heated bending and/or toughening process.

According to this invention, a continuous layer of an inorganic bake-on paint is applied onto the workpiece surface and marking or lettering the characterization is effected by means of an organic paint. The method of the invention is either to apply the organic paint onto the workpiece surface before the layer of inorganic bake-on paint is applied as a covering layer, or to apply the organic paint atop a layer of inorganic bake-on paint which has been applied and dried. In both cases, the inorganic bake-on paint is baked in during the course of the heat treatment of the workpiece.

The layer of inorganic bake-on paint, which forms a glaze-like or enamel-like coating after baking-on, is applied as a continuous layer, which in itself contains no kind of marking or lettering on application. The application of the inorganic bake-on paint is therefore simple and can be carried out by the known and usual methods, for example by screen printing. The actual characterization, in contrast, is produced by means of an organic paint, which is applied in the desired form (i.e., distinguishing symbols, numerals, letters or other indicia) at the location of the inorganic paint on the workpiece. The characterization by means of the organic paint is carried out either by lettering or printing the workpiece surface before an application of inorganic bake-on paint has been painted over the organic paint lettering, or by lettering or printing the organic paint atop the layer of inorganic paint.

If the lettering or printing with the organic paint is carried out before the application of the layer of inorganic bake-on paint, then as the layer of inorganic bake-on paint is heated, permanent faults and holes appear in the layer of inorganic bake-on paint in the form of the characterization. Presumably this effect results from the heat treatment which causes both the melting-on of the inorganic enamel layer and the burning and vaporizing of the organic paint. This heating process causes the products of organic burning and vaporization to escape through the inorganic paint layer, thus forming the aforementioned faults and holes in this layer in the form of tiny apertures. These faults and holes in the layer structure of the glaze-like or enamel-like coating are permanent and cause the lettering applied by the organic paint to remain clearly visible to the eye in the baked-on glaze or enamel coating. A subsequent modification of the characterization is not possible without destroying the enamel layer, and therefore the objective of the invention is achieved.

Similarly, if the organic lettering or marking is applied onto a dried layer of inorganic bake-on paint, a clearly visible, permanent modification to the surface of the inorganic paint layer is produced during baking-on. In this case, local surface changes take place when baking-on is carried out, although they are not discernable apertures in the enamel surface. However, these changes can be clearly recognized, especially under, obliquely incident light and are clearly permanent markings.

Since any organic paint and any printing method may be used for applying the organic paints, it is possible to make use of inexpensive printing methods which can be automated in a simple manner to provide predetermined characterization on the glass. Conventional ink jet printers, which can be fully automated, have proven especially suitable for this purpose. In this way, the workpieces can be individually and simply provided with sequential numbers or other characterizations.

Moreover, the inorganic bake-on paint can be applied by a suitable printing method, i.e. the screen printing process, which can be economically employed because a uniform printing pattern of inorganic paint is applied in all cases. Of course, the shape and dimensions of this pattern need to be chosen so that the field which the bake-on paint occupies encompasses the entire region occupied by the lettering or characterization provided by the organic paint.

In the case of automobile glass panes, it is very common to provide the border region of the glass pane with a frame-like printing of opaque, inorganic bake-on enamel which is heat treated to 550°–600° C. This frame-like coating at the border is, as a rule, performed on those automobile glass panes that are fixed in the vehicle bodywork by means of an adhesive to the fixing flange of the window frame. The opaque coating at the border has the function of preventing the adhesive strip from being seen from the outside on the one hand, and on the other hand of protecting the adhesive from UV radiation. If printing is to be done on these glass panes having border coatings, characterization is carried out with organic paint directly on the border coat of inorganic paint. In this way, additional printing of the inorganic characterization field is unnecessary, and only the characterization or lettering needs to be carried out with the organic paint.

BRIEF DESCRIPTION OF THE DRAWINGS

These and other objects, features and advantages of the present invention will be more readily apparent from the following Detailed Description of a Preferred Embodiment of the Invention in which.

DETAILED DESCRIPTION OF A PREFERRED EMBODIMENT

Figure 1:
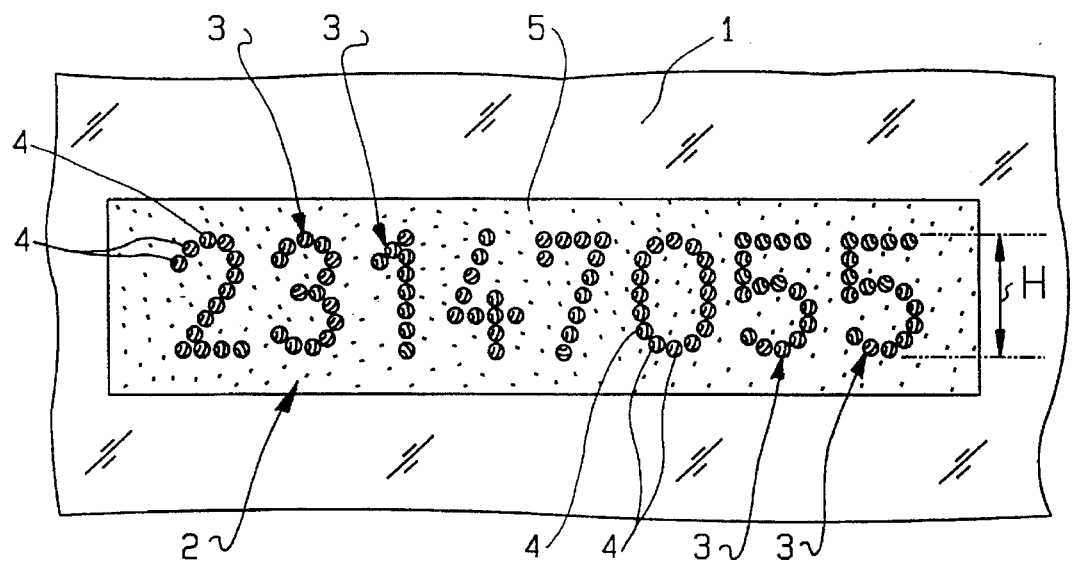
FIG. 1 is a portion of a glass pane with a characterization applied according to the method of invention.

As shown in FIG. 1, a glass pane 1 of float glass is provided with a characterization 2. Illustratively, the characterization 2 comprises a row of digits 3, each of which is composed of surface marks 4. In this embodiment the surface marks 4 comprise through holes in an opaque coating 5 of an inorganic baked-on enamel. Alternately, the surface marks can comprise slight physical or chemical modifications. The digits 3 have a height H of, for example, 4 mm. The surface marks 4 have a diameter of about 0.1 to 0.5 mm and a mutual spacing between center points of about 0.2 to 0.8 mm.

For producing such a characterization, a conventional ink jet printer is used. According to a first embodiment of the invention, an organic paint is applied in a dot grating directly onto the glass surface. Commonly, standard black organic ink is used for the ink jet printer, which is controlled by a control unit automatically providing each glass pane with a unique characterization or indicia to individually identify that glass pane. When the organic ink applied by the ink jet printer onto the glass surface has dried, which usually takes place very rapidly, the thickness of the organic paint is about 1 to 4 micrometers.

An opaque coating 5, of an inorganic bake-on paint is then printed by a screen printing process of the art so as to completely cover the numerals 3 formed by the organic paint. The screen printing paint is subjected to a drying process adapted to the particular paint utilized that may consist of an irradiation with IR rays or UV rays.

After the inorganic paint has dried, the glass pane is heated to the bake-on temperature of the inorganic paint, (i.e., about 600° C.). During this heating operation, the organic paint underneath the inorganic layer burns or vaporizes through the inorganic layer. The combustion products or gases formed during vaporization penetrate through the inorganic coating 5 and form permanent apertures in this coating 5, which exhibit the form and arrangement of the organic paint. In this manner, the characterization can be clearly seen from both sides of the glass pane 1 both in transmission and in reflection.

According to another embodiment of the invention, an inorganic layer 5 of a bake-on paint is first applied onto the surface of the glass pane 1 by a screen printing method. After the inorganic layer 5 has dried or been hardened by UV or IR radiation, a unique characterization consisting of the letters 3 is printed in organic paint onto the layer 5 by a conventional ink jet printer. Advantageously, a standard organic ink used in conventional ink jet printers is utilized for such characterization and dries comparatively rapidly. The inorganic paint layer is then baked on at a temperature of about 600° C. After the baking-on, the surface marks 4 consist of 5 slight physical or chemical modifications to the surface of the layer 5. The characterization can, in this case, be seen only on that side of the glass pane 1 onto which the layer 5 is applied. From the other side, that is to say through the glass pane 1, no irregularities or changes in the layer 5 can be seen.

Figure 2:
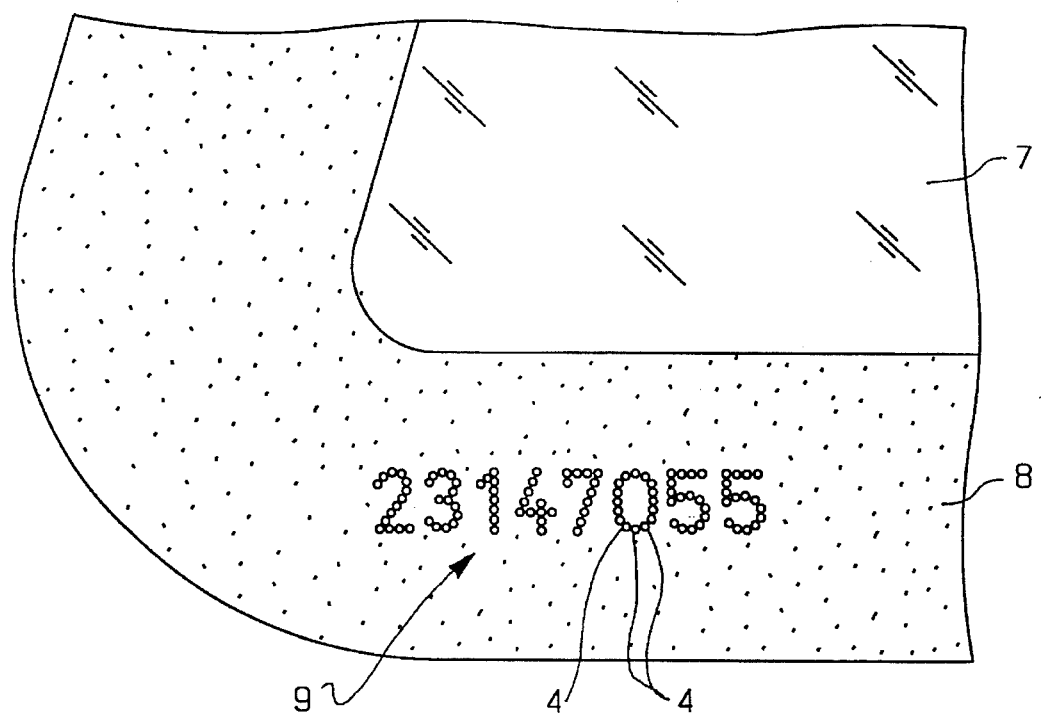
FIG. 2 is a portion of an automobile glass pane with a frame-like border coating of inorganic paint and a characterization of organic paint disposed within the border coating.

In the automobile glass pane shown partly in FIG. 2, a glass pane 7 is provided with a peripheral frame-shaped coating 8. The coating 8 consists of an opaque, inorganic bake-on paint. Within this layer 8 a characterization 9 comprising any suitable symbols, letters or digits is applied with an organic paint. The symbols, letters or digits constituting the characterization 9 are formed of small surface marks formed in the layer 8.

The method of characterization is as follows. First, the frame-shaped opaque inorganic coating 8 is printed by a screen printing process onto the flat glass pane 7 at room temperature. Then, the glass pane is subjected to a drying process utilizing IR radiation or, depending upon the composition of the inorganic printing paint, UV radiation. Next, the printing of the characterization in organic paint onto the frame-shaped coating 8 is carried out, once again by means of an automated ink jet printer. When the organic paint is dry, the glass pane is heated in a known manner to its bending temperature of about 600° C. and is bent into a desired shape. During the heating process, the organic paint modifies the inorganic paint layer 8 at its surface and forms the desired characterization in permanent form on the layer 8.

While it is apparent that the invention herein disclosed fulfills the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A method of permanently characterizing a plate glass workpiece which is subjected to a heat treatment during processing comprising the steps of:

applying identifying characteristics to said workpiece with a first paint comprising a plurality of components wherein all of said components burn and/or vaporize when heated to temperatures utilized to bend or toughen said workpiece, covering said identifying characteristics with a layer of a second paint which permanently adheres to said workpiece when heated, said second paint comprising components that are able to withstand temperatures utilized to bend or toughen said workpiece without burning and/or vaporizing, and heating said workpiece to a temperature sufficiently high that said second paint permanently adheres to said workpiece and said first paint burns and/or vaporizes whereupon the layer of said second paint is modified in accordance with said identifying characteristics applied with said first paint.

2. The method of claim 1 wherein the step of heating said workpiece is performed during said heat treatment.

3. The method of claim 1 wherein said first paint is applied by an ink jet printer.

4. The method of claim 3 wherein said first paint comprises a black ink suitable for use in said ink jet printer.

5. The method of claim 1 wherein said second paint is applied by means of a screen printing process.

6. The method of claim 1 wherein said second paint is applied to the workpiece so that it is not transparent to light.

7. The method of claim 1 wherein said second paint is dried by means of IR or UV radiation.

8. The method of claim 1 wherein said workpiece is heated to approximately 600° C.

9. The method of claim 1 wherein said modifications to said second paint comprise permanent apertures therethrough.

10. The method of claim 2 wherein said heat treatment is utilized to bend said workpiece.

11. The method of claim 2 wherein said heat treatment is utilized to toughen said workpiece.

12. A method of permanently characterizing a plate glass workpiece which is subjected to a heat treatment during processing comprising the steps of:

applying a layer of a first paint to an area of said workpiece to be characterized, wherein said first paint permanently adheres to said workpiece when heated and comprises components that are able to withstand temperatures utilized to bend or toughen said workpiece without burning and/or vaporizing, applying identifying characteristics atop said layer of first paint with a second paint comprising a plurality of components wherein all of said components burn and/or vaporize when heated to temperatures utilized to bend or toughen said workpiece, and heating said workpiece to a temperature sufficiently high that said first paint permanently adheres to said workpiece and said second paint burns and/or vaporizes whereupon the layer of said first paint is modified in accordance with said identifying characteristics applied with said second paint.

13. The method of claim 12, wherein said modifications to said first paint comprise physical or chemical modifications to a top layer of said first paint.

* * * * *